C. H. LOOMIS.
BRIDLE ATTACHMENT.
APPLICATION FILED NOV. 11, 1919.

1,355,057.

Patented Oct. 5, 1920.

WITNESS:
F. L. Fox,

INVENTOR.
C. H. Loomis.
BY
Victor J. Evans
ATTORNEY.

UNITED STATES PATENT OFFICE.

CHARLES HERBERT LOOMIS, OF EDGELEY, NORTH DAKOTA.

BRIDLE ATTACHMENT.

1,355,057. Specification of Letters Patent. Patented Oct. 5, 1920.

Application filed November 11, 1919. Serial No. 337,113.

*To all whom it may concern:*

Be it known that I, CHARLES H. LOOMIS, a citizen of the United States, residing at Edgeley, in the county of La Moure and State of North Dakota, have invented new and useful Improvements in Bridle Attachments, of which the following is a specification.

This invention relates to harness attachments and aims to provide a nose guard which may be removably secured to the animal's bridle to protect the said animal from the annoyance of flies or other insects.

Another object of the invention is the provision of a device of this character which may be swingingly mounted beneath the lips of the animal and provided with means for brushing the lips and nostrils to protect the same.

A further object is the provision of a guard, which is neat and simple in construction and appearance and which may be removably and adjustably secured in position.

Other objects and advantages of the invention will appear as the following description is read in connection with the accompanying drawings.

Figure 1:
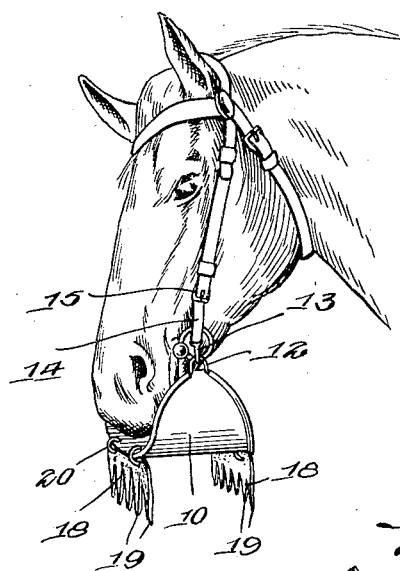
Figure 1 is a side elevation showing the invention in use.
Figure 2:
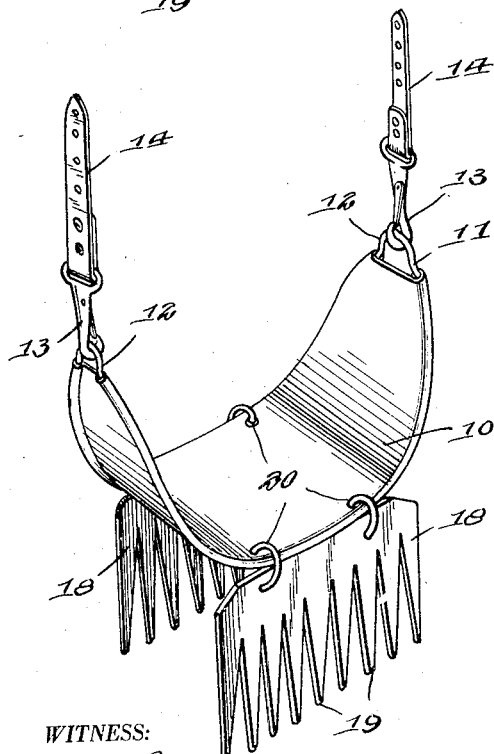
Fig. 2 is a detail perspective view of the invention.
Figure 3:
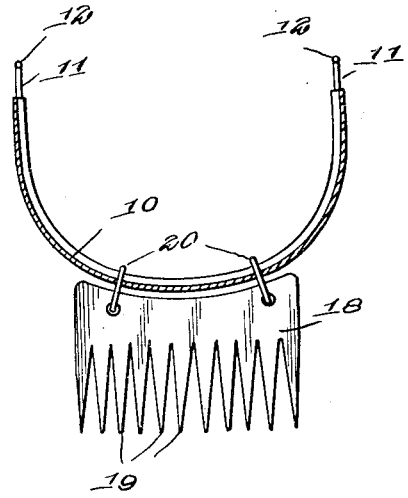
Fig. 3 is a central transverse sectional view.

In carrying out the invention, there is provided a guard, which includes a body member 10, the latter being preferably formed of metal and of substantially semi-circular shape. This body member tapers toward each end and is provided along each edge with a reinforcing member, preferably in the form of a wire 11, the latter being bent at each end of the body member to provide loops 12. This wire is secured in position by bending the material over around the same. The loops 12 are for the purpose of receiving snap-hooks 13, which are secured to one end of a short strap 14. The opposite ends of the strap 14 are secured to buckles 15, carried by the bridle checks, permitting of a proper adjustment of the guard with respect to the mouth of the animal.

Secured to each edge of the body member is a fringe 18, the latter being preferably formed of leather cut to provide strips 19. This fringe is secured to the body member through the medium of rings 20, which pass through openings in the said body member and in the adjacent edges of the fringe.

In the use of the invention, the guard is secured to the rings of the bridle bit through engagement of the snap-hooks 16, and when in such position will swing beneath the mouth of the animal, due to the motion of the said animal's head. This will cause the fringe 18 to wipe against the nostrils and lips of the animal, so as to brush away flies or other insects.

The invention is susceptible of various changes in its form, proportions and minor details of construction and the right is herein reserved to make such changes as properly fall within the scope of the appended claims.

Having described the invention, what is claimed is:—

1. A nose guard for animals comprising in combination with a bridle, a body member tapered at each end, a reinforcing and stiffening wire secured along the opposite edges of the said body member, said wire being extended beyond each end of said member and bent to provide loops, means whereby the loops may be connected to the bridle of the animal and a fringe secured to the opposite edges of the body member.

2. A nose guard for animals comprising in combination with a bridle, a substantially semi-circular body member, a fringe disposed longitudinally of the opposite edges of said member, rings passing through the fringe and the semi-circular body member to provide for a free swinging movement of the fringe and means for securing the guard to the bridle of the animal.

In testimony whereof I affix my signature.

CHARLES HERBERT LOOMIS.